US011928953B2

(12) United States Patent
Lovejoy et al.

(10) Patent No.: US 11,928,953 B2
(45) Date of Patent: Mar. 12, 2024

(54) GARAGE DOOR OPENER MAINTENANCE AND SERVICES

(71) Applicant: ASSA ABLOY Residential Group, Inc., New Haven, CT (US)

(72) Inventors: Garrett Lovejoy, Madison, NC (US); David P. Bresson, Pfafftown, NC (US); Vickie Lents, Winston-Salem, NC (US); Mark Caterino, Prospect, CT (US); Jason Williams, Atlanta, GA (US); Kevin C. Kraus, Monument, CO (US)

(73) Assignee: ASSA ABLOY Residential Group, Inc., New Haven, CT (US)

( * ) Notice: Subject to any disclaimer, the term of this patent is extended or adjusted under 35 U.S.C. 154(b) by 377 days.

(21) Appl. No.: 17/155,205

(22) Filed: Jan. 22, 2021

(65) Prior Publication Data

US 2021/0233385 A1 Jul. 29, 2021

Related U.S. Application Data

(60) Provisional application No. 62/965,038, filed on Jan. 23, 2020.

(51) Int. Cl.

| | |
|---|---|
| ***G08B 25/10*** | (2006.01) |
| ***E05F 15/668*** | (2015.01) |
| ***G08B 7/06*** | (2006.01) |

(52) U.S. Cl.

CPC ............ *G08B 25/10* (2013.01); *E05F 15/668* (2015.01); *G08B 7/06* (2013.01); *E05Y 2201/434* (2013.01); *E05Y 2400/32* (2013.01); *E05Y 2400/44* (2013.01); *E05Y 2400/66* (2013.01); *E05Y 2400/818* (2013.01); *E05Y 2900/106* (2013.01)

(58) Field of Classification Search

CPC ........... E05Y 2201/434; E05Y 2400/32; E05Y 2400/44; E05Y 2400/66; E05Y 2400/818; E05Y 2900/106; E05Y 2400/40

See application file for complete search history.

(56) References Cited

U.S. PATENT DOCUMENTS

| | | | | |
|---|---|---|---|---|
| 7,038,582 | B2 | 5/2006 | Hom et al. | |
| 7,057,547 | B2 | 6/2006 | Olmsted et al. | |
| 7,127,847 | B2 * | 10/2006 | Fitzgibbon | G07C 9/00182 49/28 |
| 7,151,351 | B2 | 12/2006 | Piechowiak et al. | |
| 7,181,203 | B2 | 2/2007 | Gregori | |
| 7,196,611 | B2 | 3/2007 | Robb et al. | |
| 7,224,275 | B2 | 5/2007 | Fitzgibbon | |
| 7,262,572 | B2 | 8/2007 | Fitzgibbon | |
| 7,468,676 | B2 | 12/2008 | Styers et al. | |
| 7,493,726 | B2 | 2/2009 | Fitzgibbon et al. | |
| 7,750,890 | B2 | 7/2010 | Fitzgibbon et al. | |

(Continued)

*Primary Examiner* — John A Tweel, Jr.

(74) *Attorney, Agent, or Firm* — Calfee, Halter & Griswold LLP

(57) ABSTRACT

A garage door opener system includes a garage door opener having one or more sensors configured to monitor the status of a garage door as it moves between first and second positions. The garage door opener system may detect one or more anomalies in a profile generated from information from the one or more sensors and alert a user to the presence of those anomalies. The garage door opener system may allow a user to find and contact a service provider to address the one or more anomalies.

24 Claims, 9 Drawing Sheets

(56) References Cited

U.S. PATENT DOCUMENTS

| | | | | |
|---|---|---|---|---|
| 7,876,218 | B2 | 1/2011 | Fitzgibbon | |
| 8,040,217 | B2 | 10/2011 | Fitzgibbon | |
| 8,345,010 | B2 | 1/2013 | Fitzgibbon et al. | |
| 8,494,861 | B2 | 7/2013 | Robb et al. | |
| 8,952,783 | B2 | 2/2015 | Fitzgibbon | |
| 9,514,583 | B2 * | 12/2016 | Zasowski | G06F 3/0482 |
| 10,087,673 | B1 | 10/2018 | Rosenmarkle et al. | |
| 10,096,187 | B2 * | 10/2018 | Deneen | E05F 15/70 |
| 11,313,168 | B2 * | 4/2022 | Virgin | E05F 15/72 |
| 2018/0106094 | A1 | 4/2018 | Hoermann | |
| 2019/0244448 | A1 | 8/2019 | Alamin et al. | |

* cited by examiner

GARAGE DOOR OPENER MAINTENANCE AND SERVICES

CROSS REFERENCE TO RELATED APPLICATION

This application claims the benefit under 35 U.S.C. § 119(e) of U.S. Provisional Application No. 62/965,038, filed Jan. 23, 2020, which is hereby incorporated by reference in its entirety.

FIELD

Disclosed embodiments are related to garage door opener maintenance and services and related methods.

BACKGROUND

Garage door openers are commonly employed to open and close garage doors automatically. Garage door openers and the associated door undergo regular maintenance to ensure proper functioning of the garage door opener. Service providers perform this maintenance and diagnose problems, replace parts, or otherwise repair the garage door opener and associated door.

SUMMARY

In some embodiments, a garage door opener system includes a motor configured to move a garage door between a first position and a second position, a sensor configured to collect information about the garage door as the garage door moves between the first position and second position, memory including processor executable instructions, and a processor configured to execute the processor executable instructions stored in the memory. The processor executable instructions include establishing a baseline profile of the garage door from the information, determining one or more subsequent profiles of the garage door from information collected on movements of the garage door between the first position and second position, comparing the one or more subsequent profiles to the baseline profile, identifying one or more anomalies in the one or more subsequent profiles, and alerting a user to the one or more anomalies.

In some embodiments, a garage door opener system includes a garage door opener having one or more sensors configured to collect information about a garage door as the garage door moves between a first position and second position and a wireless transceiver. The garage door opener system also includes a remote device in communication with the wireless transceiver having a screen displaying a graphical user interface, memory including processor executable instructions, and a processor configured to execute the processor executable instructions stored in the memory on command from the graphical user interface. The graphical user interface is operable to move the garage door between the first position and second position, and wherein the graphical user interface is operable to initiate a diagnostics mode in which the processor receives information from the one or more sensors, establishes a baseline profile of the garage door from the information, determines one or more subsequent profiles of the garage door from information collected on movements of the garage door between the first position and second position, compares the one or more subsequent profiles to the baseline profile, identifies one or more anomalies in the one or more subsequent profiles, and alerts a user to the one or more anomalies.

In some embodiments, a method of installing a garage door opener system includes installing a garage door opener and/or a garage door opener wall unit, scanning a code disposed on the garage door opener and/or garage door opening wall unit with a servicer device, and populating service provider information in one or more fields stored in memory of the garage door opener and/or garage door opener wall unit.

In some embodiments, a method of operating a garage door opener system includes receiving information from one or more sensors as a garage door moves between a first position and a second position, establishing a baseline profile of the garage door from the information, receiving additional information from the one or more sensors as the garage door subsequently moves between the first position and second positions, determining one or more subsequent profiles of the garage door from the additional information, comparing the one or more subsequent profiles to the baseline profile, identifying one or more anomalies in the one or more subsequent profiles, and alerting a user to the one or more anomalies.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
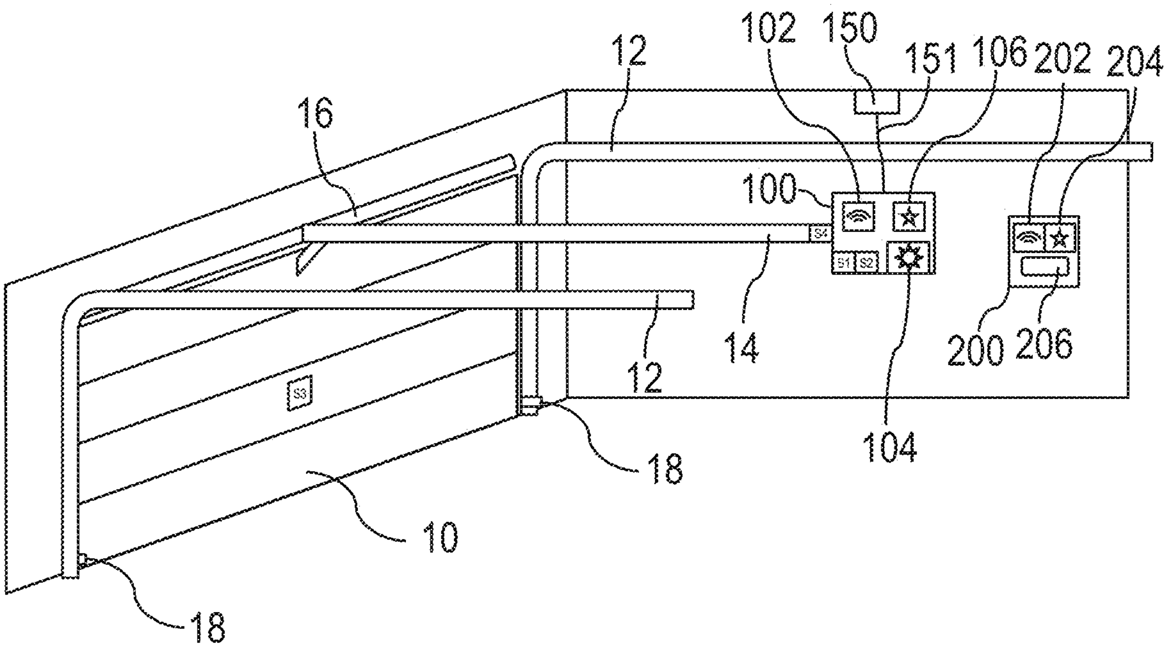
FIG. 1 is a perspective view of one embodiment of a garage door opener system.

Garage door openers and associated doors have regular maintenance schedules to ensure proper operation. Oftentimes, these regular maintenance schedules are neglected and a garage door opener and/or a garage door may develop one or more anomalies over time that affect the operation of the door. Additionally, accidents or misuse may also cause wear and tear on a garage door opener that results in improper, noisy, or inefficient operation. When these anomalies occur, a user may not be able to fix the problem, or may lack the prerequisite knowledge to do so. Additionally, a user may be unfamiliar with appropriate service providers in the area who could repair the problem.

In view of the above, the inventors have recognized the benefits of a garage door opener system which provides alerts to a user as to the status of a garage door opener and associated door. For example, the garage door opener system may include one or more sensors which provide information about the garage door system. A processor may use the information to detect one or more anomalies and relay those anomalies to the user. In some embodiments, a garage door opener system may provide instructions for self-help or self-repair to a user. In some embodiments, a garage door opener system may provide service provider information to a user, and may provide the service provider diagnostic information to simplify repair or maintenance of the garage door opener system.

In some cases, a garage door opener system may be installed by a local service provider without any contact with an eventual end user. That is, a garage door opener may be installed by a prior owner, developer, or other entity without direct knowledge of the installation by an end user. Accordingly, an end user may not know information about the local service provider who performed the initial installation.

In view of the above, the inventors have recognized the benefits of a garage door opener system that provides service provider information to an end user. For example, a graphical user interface (GUI) on a garage door wall unit or personal computing device may relay contact information or other details of a service provider to an end user. In some embodiments, a garage door opener system may automatically schedule garage door opener service or prompt the end use to schedule service.

In some embodiments, a garage door opener system includes a garage door opener and one or more associated control devices (e.g., wall unit, personal computing device, etc.). The garage door opener may include a motor operatively coupled to a garage door to move the door between a first position (e.g., closed position) and a second position (e.g., open position). The garage door opener may also include a processor and memory including processor executable instructions, where the processor is configured to execute the processor executable instructions stored on the memory. The garage door opener may also include a communications module (e.g., a wireless transceiver) configured to allow the garage door opener to communicate with the one or more associated control devices and/or any other associated device, such as a remote server. The garage door opener may also include one or more sensors configured to collect information about the garage door opener and the associated garage door when the garage door opener is operated. The garage door opener may be operated on command from the one or more associated control devices. For example, a button on a wall unit or a personal computing device may be pressed/actuated by a user to operate the garage door.

In some embodiments, a garage door opener system processor may receive information from one or more sensors when a garage door opener is operated. The one or more sensors may include a current sensor for measuring the current draw of a motor, a position sensor for measuring the position of a door, and/or a camera for imaging the door. Using the information from the one or more sensors, a processor may establish a baseline profile for operation of the garage door. The baseline may be computed from an initial run and verified by an installer (e.g., service provider). In some embodiments, the baseline may be established via multiple cycles of the garage door opener and averaged such that erroneous or outlying measurements from the one or more sensors may be discarded from the baseline profile. Once the baseline profile is established, the processor may compute subsequent profiles for each cycle or set of cycles of the garage door opener. These subsequent profiles may be compared to the baseline profile. If the subsequent profile (or profiles) differs from the baseline profile by a threshold amount, the processor may identify one or more anomalies where the differences lie. These one or more anomalies may be associated with maintenance or performance degradation of the garage door opener and/or associated door, and a user may be alerted to the presence of the one or more anomalies. As will be discussed further herein, instructions to rectify the identified anomaly may be provided to the user and/or the user may be provided the option to schedule a service appointment or contact a service provider for the anomaly. In the case a service provider is contacted, the baseline profile and anomalous profile or profiles may be provided to the service provider to allow the service provider to identify and repair the problem.

In some embodiments, a garage door opener system may include one or more control devices associated with a garage door opener. For example, in one embodiment, a garage door opener system may include a wall unit and a personal computing device such as a smartphone. The wall unit and personal computing device may include a user interface (e.g., a physical interface or a graphical user interface) through which a user may control a garage door opener. The wall unit and/or personal computing device may relay information from the garage door opener to the user. For example, in some embodiments, a graphical user interface of a personal computing device may alert a user to the one or more anomalies, allow a user to view service provider information, and allow a user to schedule a service appointment with a service provider. An interface of a control device may also relay the status of a garage door (e.g., open or closed) and may also provide other diagnostics information that may be useful to a user. For example, in some embodiments a control device may provide a cycle count, a recommended service date, or other appropriate information.

According to exemplary embodiments described herein, information may be relayed to a user from one or more devices in any suitable manner. In some embodiments, information may be relayed to a user through an indicator light (e.g., an LED) which illuminates depending on certain conditions. For example, an indicator light may illuminate to indicate the presence of one or more anomalies in the operation of a garage door opener. In some embodiments, the indicator light may blink in various patterns or colors to indicate different conditions, and may be disposed on a garage door opener and/or wall unit. In some embodiments, information may be relayed to user audibly through a speaker. The speaker may emit a tone and/or voice to relay information (e.g., one or more anomalies) to a user. In some embodiments, a graphical user interface or display may be used to relay information to a user with text, icons, or illustrations. Of course, any suitable indication to relay information may be employed for a garage door opener system, as the present disclosure is not so limited.

In some embodiment, information from a garage door opener, wall unit, or another associated device may be transmitted to a remote server (e.g., via the internet). For example, information provided directly from one or more sensors to the remote server. Alternatively, profiles computed by a local processor of the garage door opener system may be provided to a remote server. The information provided to the remote server may be anonymized and may be optionally tagged with markers indicating the type of garage door and garage door opener the information is being transmitted from. In some embodiments, the remote server may include processing power greater than that of the garage door opener system. Accordingly, the remote server may be used to analyze the information from the garage door opener to detect one or more anomalies. For example, the remote server may test the information against information from similar normally operating garage door opener systems. The remote server may also match a detected anomaly to a physical issue or issues with the garage door opener system, which may then be used to provide instructions to a user or service provider to rectify the issue. In some embodiments, the remote server (or servers) may collect information from a plurality of garage door opener systems and use the information to generate models to predict failures, improve components, or otherwise provide feedback to service providers and/or manufacturers. For example, in one embodiment, machine learning may be employed to determine if a particular profile from a garage door system is indicative of impending failure or degradation based on a data set including a plurality of garage door opener systems with nominal and anomalous operational profiles. Such a prediction may be relayed to an end user so that they may schedule service or be aware of potential issues that may arise with their garage door opener system. Of course, a remote server may perform any suitable calculation, as the present disclosure is not so limited.

In some embodiments, a method of operating a garage door opener system includes receiving information from one or more sensors as a garage door moves between a first position and a second position. The garage door may move between a first position and a second position in response to a command from a control device such as a personal computing device or wall unit. The method may also include establishing a baseline profile of the garage door form the information. For example, a profile may be a series of sensor measurements over time. Alternatively, a profile may be a series of sensor measurements over measured position of the door. Of course, a profile may include any suitable information, as the present disclosure is not so limited. The method may also include receiving additional information from the one or more sensors and establishing one or more subsequent profiles. The method may also include comparing the one or more subsequent profiles to the baseline profile and identifying one or more anomalies in the one or more subsequent profiles. The method may also include alerting a user to the presence of the one or more anomalies. In some embodiments, the one or more anomalies may be transmitted to a service provider. In some embodiments, instructions may be provided to a user for repairing or mitigating the anomaly.

In some embodiments, a method of installing a garage door opener system includes installing a garage door opener and/or a garage door opener wall unit. The wall unit may be operable to control the garage door opener to open or close an associated garage door. The method may also include scanning a code disposed on at least one of the garage door opener and wall unit. Scanning the code may include using a servicer device to scan the code (e.g., with an IR scanner or camera). In some embodiments, the code may be a QR code. The method may include populating service provider information in one or more field store in memory of the garage door opener and/or garage door opener wall unit. The population of information may be caused by the scanning of the code. That is, scanning the code may cause the servicer device or a remote service to populate information in one or more fields stored in memory of the garage door opener or wall unit. In some embodiments, the populated fields may be stored on a remote server and copied to a garage door opener or wall unit local memory on request.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic perspective view of one embodiment of a garage door opener system deployed in a garage. As shown in FIG. 1, the garage includes a garage door 10 which is mounted inside of rails 12. The garage door is coupled to a trolley disposed in a trolley rail 14 and garage door spring 16 which cooperate to open and close the garage door 10. That is, the trolley is coupled to a garage door opener 100 of the garage door opener system, which is configured to move the garage door 10 between open and closed positions. The garage door opener 100 may include a motor operatively coupled to the trolley to move the trolley along the trolley rail 14 to open and close the garage door 10. According to the embodiment shown in FIG. 1, the garage door is segmented and may be coupled to the rails 12 with a plurality of wheels which roll along the rails 12.

As shown in FIG. 1, the garage door opener 100 includes a communications module 102, which may be used to communicate wirelessly with a plurality of associated devices. The communications module may be any appropriate communications module for wired or wireless communications. The communications module may communicate using any suitable protocol, including, but not limited to, Bluetooth, Z-Wave, ZigBee, 802.15.4, GSM, CDMA, Wi-Fi, Thread, etc. As noted above, the garage door opener may also include a motor configured to move the garage door between open and closed positions. The garage door opener may include a processor and memory configured to control the operation of the motor. That is, the processor may execute processor executable instructions stored on the memory. The processor may also coordinate communications sent and received via the communications module 102. As shown in FIG. 1, the garage door opener of the depicted embodiment includes an illumination light 104 and an indicator 106 (e.g., a light). The illumination light is configured to provide illumination for the garage space, and may be activated by a motion sensor, light switch, or operation of the garage door opener. The indicator 106 is configured to communicate information to a user regarding the status of the garage door opener. For example, the indicator 106 may be employed to indicate one or more anomalies detected by the garage door opener, indicate an opening or closing status, indicate a power status, or any other desirable information. In some embodiments, one or both of the illumination light and indicator light may be not included with the garage door opener. In some embodiments, an indicator light and illumination light may be integrated into a single light. An indicator light may use any suitable combination of blinking or color to relay various states of the garage door opener.

In some embodiments, the garage door opener 100 may include one or more sensors configured to monitor the status of the garage door 10 as it moves between open and closed positions. For example, the garage door opener includes photo-eyes 18 disposed at opposite sides of the garage door that monitor a garage door opening for obstructions that would impede the garage door 10. The garage door opener may also include other sensors that more directly monitor the status of the garage door. For example, the garage door opener may include a current sensor S1 that monitors current draw of the motor of the garage door opener. The garage door opener may also include a camera S2 oriented at the garage door opening such that image processing may be used to determine the position of the door. Tilt sensors (e.g., S3) may be employed on the garage door 10 that help to monitor a position of the garage door between open and closed positions. A distance sensor S4 such as a laser rangefinder may be employed to measure a position of the trolley disposed on the trolley rail 14. Each of the sensors employed with the garage door opener may provide information to the processor of the garage door opener so that the processor may generate a profile for a given cycle or set of cycles of opening and closing the garage door.

As shown in FIG. 1, in some embodiments the garage door opener 100 may have power supplied from a power unit 150 via a power cable 151. According to the embodiment of FIG. 1, the power unit may be plugged into a standard wall outlet and may simply provide power to the garage door opener. In some embodiments, a power unit may include one or more sensors, a communications module, a processor, and memory. In such an embodiment, these elements may be moved out of a garage door opener and maintained in the power unit. The power unit may monitor the status of the garage door opener 100 and garage door 10 via the one or more sensors. In one embodiment, the power unit may include a current sensor to monitor the current draw of the garage door opener. Such an embodiment may be well suited to retrofit application where the garage door opener is already installed and does not include connected functionality or sensors that monitor the garage door status. Accordingly, the methods of operations described herein may be applied to a garage door opener itself, as well as a power unit which is used to retrofit an existing garage door opener with connected functionality.

As shown in FIG. 1, the garage door opener system also includes a wall unit 200. The wall unit 200 includes a communications module 202, an indicator 204, and a user interface 206. The communications module may be a wired or wireless communications module configured to allow the wall unit to communicate with one or more devices. The indicator 204 may be used to relay information to a user. In some embodiments, the indicator may be a screen displaying a graphical user interface. In some embodiments, the indicator may be an indicator light configured to illuminate to convey information to a user. The user interface 206 is configured as a button which is operable to control the wall unit and the garage door opener. Of course, any suitable physical or digital interface may be employed to allow a user to control a garage door opener and a wall unit, as the present disclosure is not so limited. For example, in one embodiment, a wall unit may include one or more buttons, switches, touch screens (e.g., capacitive), etc. According to the embodiment of FIG. 1, the wall unit 200 and garage door opener 100 may communicate wirelessly. Of course, the wall unit may be wired to the garage door opener, as the present disclosure is not so limited.

Figure 2:
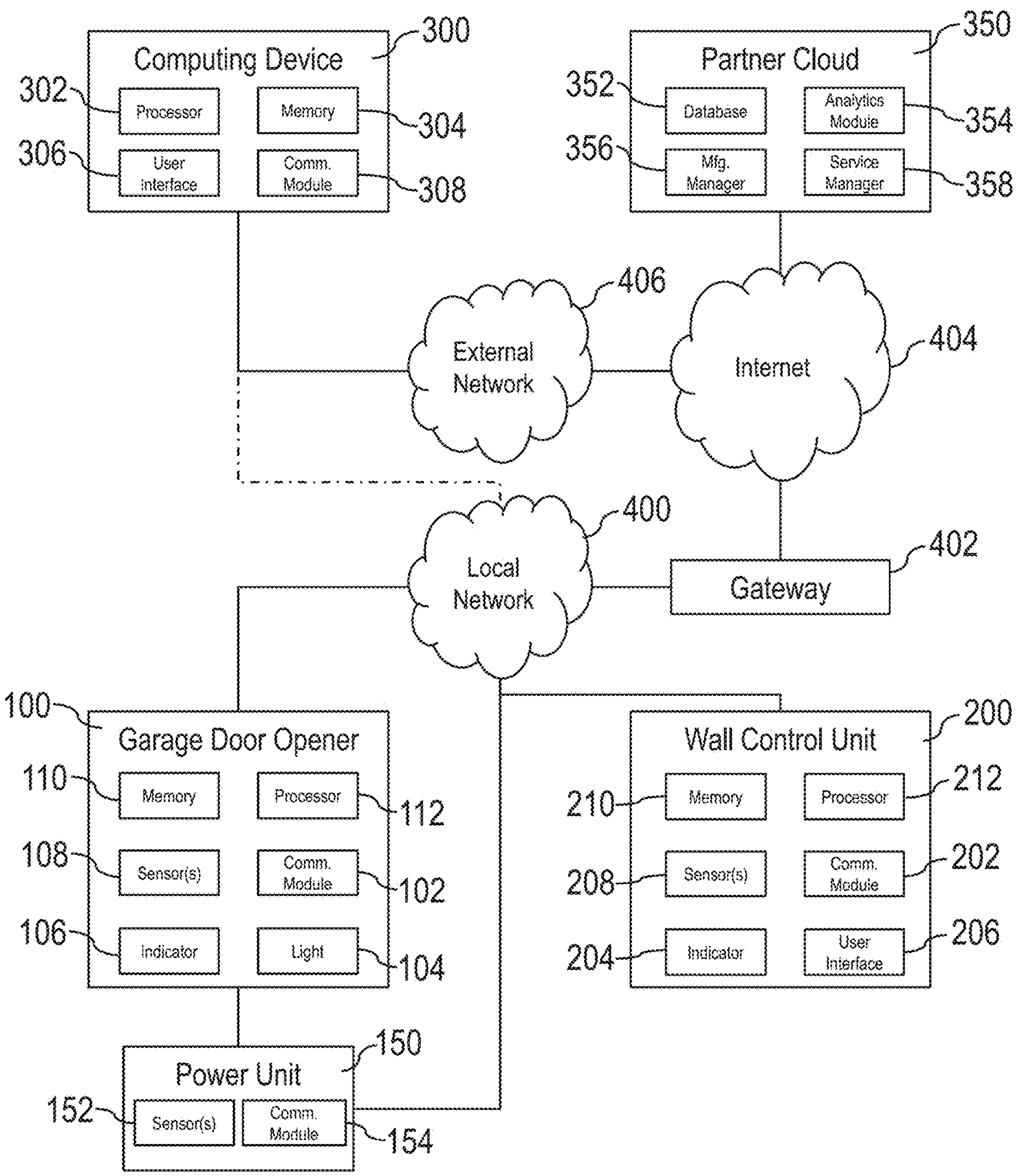
FIG. 2 is a block diagram of one embodiment of a garage door opener system.

FIG. 2 is a block diagram of one embodiment of a garage door opener system showing the communication between various components of the system. As shown in FIG. 2, a garage door opener 100 may include a communications module 102, an illumination light 104, and an indicator 106. The indicator may be an indicator light as shown and described with reference to FIG. 1, or may be another suitable device to convey information to a user. For example, the indicator may be a speaker configured to emit an audible tone and/or voice to convey information to a user. Of course, in some embodiments multiple indicators may be employed, as the present disclosure is not so limited. As shown in FIG. 2, the garage door opener includes sensors 108, which may be used to monitor the status of an associated garage door. As discussed previously the sensors may include any suitable number or type of current sensors, position sensors, optical sensors, etc. that monitor the garage door as it moved between open and closed positions. As shown in FIG. 2, the garage door opener also includes a memory 110 and a processor 112 that is configured to execute processor executable instructions stored on the memory 110. As shown in FIG. 2, the garage door opener 100 is configured to communicate with a local network 400 via the communications module 102. The garage door opener may also communicate with a power unit 150 via the communications module 102. However, in some embodiments, the power unit 150 may merely supply power to the garage door opener 100.

As shown in FIG. 2, the power unit 150 includes sensors 152 and a communications module 154. Like the garage door opener 100, the sensors 152 may be used to monitor the status of the associated garage door and/or the status of the garage door opener. For example, the sensors 152 may include a current sensor configured to monitor power draw of the garage door opener 100. The communications module 154 may enable wired or wireless communication between components of the garage door system. For example, as shown in FIG. 2, the power unit 150 may communicate with a local network 400.

According to the embodiment of FIG. 2, the garage door opener system includes a wall unit 200. The wall unit includes a communications module 202 configured to enable wired or wireless communication to one or more components of the garage door opener system. The wall unit also includes an indicator 204 and a user interface 206. As noted previously, the indicator 204 may be a light, speaker, display, or other suitable element for communication information to a user. The user interface 206 may be a physical interface like a button, or a virtualized interface like a graphical user interface. In some embodiments as shown in FIG. 2, the wall unit 200 may also include sensors 208 which may be configured to monitor the associated garage door or a garage space in general. For example, in one embodiment, the sensors 208 may include a motion sensor such that the wall unit may cause the illumination light 104 of the garage door opener 100 to illuminate. Of course, any suitable sensors may be employed, as the present disclosure is not so limited. In some embodiments as shown in FIG. 2, the wall unit 200 includes memory 210 and a processor 212. The processor 212 may be used to control the wall unit, including the indicator 204 and communications module 202.

As shown in FIG. 2, the various components of the garage door opener system may communicate with one another via a combination of local networks 400, external networks 406, and the internet 404. A "network" may include direct communication (e.g., communications module to communications module) or it may include indirect communication (e.g., through a series of router, repeaters, and/or switches). According to one embodiment as shown in FIG. 2, the garage door opener 100, power unit 150, and wall unit 200 may communicate via the local network 400. The local network may be a wireless network (e.g., Bluetooth, Wi-Fi, Z-wave, etc.), or may be a wired network (e.g., Ethernet). A gateway 402 may be used to connect the local network 400 to the internet 404. For example, in one embodiment, the gateway may communicate with the garage door opener, 100, power unit 150, and/or wall unit 200 via a local protocol such as Bluetooth, and may communicate with an internet source via another protocol such as Wi-Fi. The external network 406 may be another local network or a larger distributed network. For example, a computing device 300 may communicate via a cellular network or remote Wi-Fi network. In some embodiments, the computing device 300 may also communicate directly with the local network 400. In some embodiments, the computing device may be a smartphone configured to communicate on both the local and external networks. As shown in FIG. 2, a partner cloud 350 (e.g., a remote server or distributed servers) communicates with the garage door opener system via the internet 404.

According to the embodiment of FIG. 2, the garage door opener system may communicate with a computing device 300 via the local network 400, internet 404, external network 406, or any combination thereof. As shown in FIG. 2, the computing device includes a processor 302 and memory 304, where the processor is configured to execute instructions stored on the memory. The computing device also includes a user interface 306 and a communications module 308. The computing device may be a smartphone, tablet, laptop, personal computer, smartwatch or any other suitable device. The user interface 306 may provide information to a user and allow a user to control various components of the garage door opener system. In some embodiments, the user interface may be a graphical user interface included as a part of an application. The communications module may communicate wirelessly with an external network and/or local network via any suitable protocol. Thus, the computing device 300 may be used to monitor the status of the garage door opener system remotely, perform diagnostics, contact service providers, and other desirable functions.

According to one embodiment as shown in FIG. 2, a garage door opener system may communicate with a partner cloud 350. The partner cloud may be arranged as a remote server or distributed set of servers which allows communication between a garage door opener system and a service provider. The partner cloud may also perform analysis of information from the sensors of the various components of the garage door opener system for performing predictive degradation analytics, informing service providers, and providing manufacturer feedback. As shown in FIG. 2, the partner cloud includes a database 352 that is configured to store information received from the garage door opener system. For example, sensor information from the garage door opener 100, power unit 150, and/or wall unit 200 may be stored in the database 352. The database may also store service provider information, which may be provided and presented to the user via the computing device 300 or a component of the garage door opener system (e.g., the wall unit 200). In some embodiments, the servicer provided information may be sent to the garage door opener system and stored in one or more fields on local memory (e.g., memory 110, 210). The partner cloud also includes an analytics module 354, which may be configured as a processor or set of processors configured to analyze sets of data stored in the database. The analytics module may identify performance trends for a plurality of garage door opener systems, identify individual anomalies of a garage door opener system, or perform other analysis not performed by local processors of the garage door opener system. The information produced by the analytics module 354 may be provided to manufacturers through a manufacturing manager 356 or service providers via a service manager 358. The manufacturing manager may relay feedback for manufacturing including part wear, performance degradation, etc. so that the manufacturer may modify products or otherwise incorporate the feedback into the design or manufacturing process. The service manager may coordinate service of the garage door opener. For example, the service manager may allow a user to schedule appointments, send diagnostics information or a service provider, and/or contact a service provider.

Figure 3:
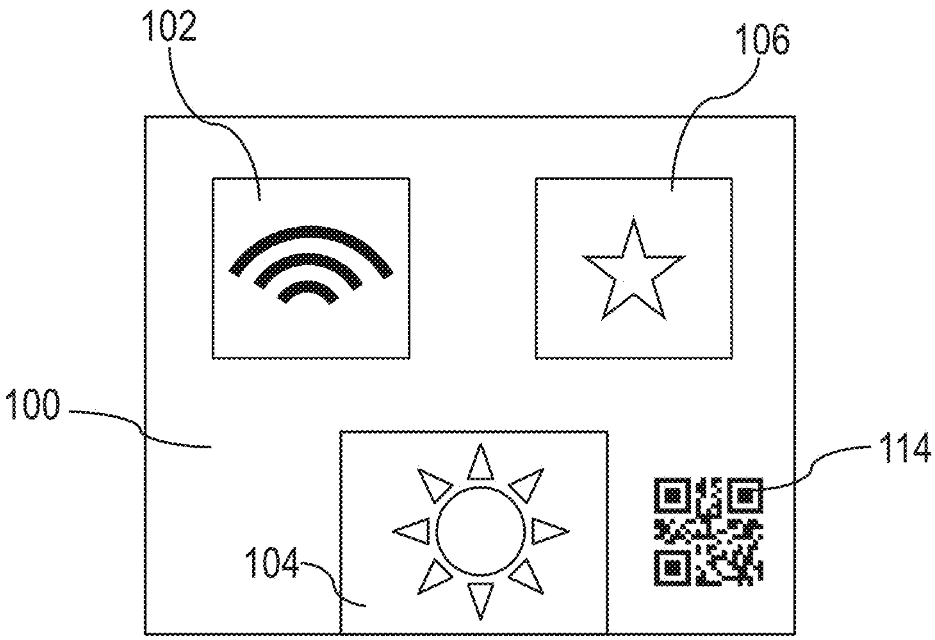
FIG. 3 is a schematic of one embodiment of a garage door opener.

FIG. 3 is a schematic of one embodiment of a garage door opener 100. As shown in FIG. 3, the garage door opener includes a communications module 102, an illumination light 104, and an indicator 106 (e.g., a light), as discussed previously with reference to FIG. 1. In some embodiments as shown in FIG. 3, the garage door opener may include a code 114. The code 114 may be scannable by a service provider device (e.g., a smartphone, PDA, etc.) to populate one or more fields stored in memory of the garage door opener with contact information of the service provider. For example, the code 114 may include a unique address to which the service provider information may be sent locally or over the internet. Such an arrangement may be beneficial to allow a user to of the garage door opener to retrieve service provider contact information on demand. In some embodiments, during an installation or service process, a service provider may be able to scan the code 114 to populate or update the one or more fields stored in memory of the garage door opener. The code 114 is configured as a QR code, but any suitable code may be employed, as the present disclosure is not so limited.

Figure 4:
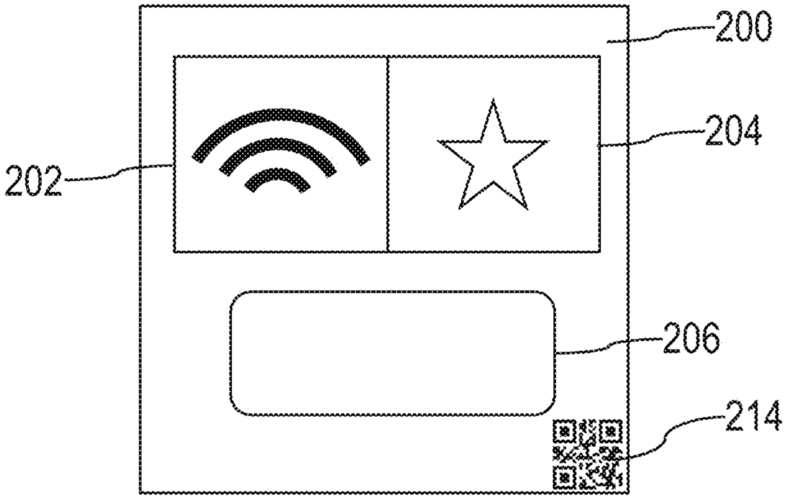
FIG. 4 is a schematic of one embodiment of a wall unit.

FIG. 4 is a schematic of one embodiment of a wall unit 200. As shown in FIG. 4, the wall unit includes a communications module 202, an indicator 204, and a user interface 206, as discussed previously with reference to FIG. 1. In some embodiments as shown in FIG. 4, the wall unit includes a code 214. The code may be scanned by a service provider device (e.g., a smartphone, PDA, etc.) to populate one or more field stores in memory of the wall unit with contact information of the service provider, in a manner similar to that discussed with reference to FIG. 3. In some embodiments, both the wall unit 200 and a garage door opener may include a code. In other embodiments, one of the wall unit and a garage door opener may include a code and the stored information may be shared and accessible from the various components of garage door opener system and associated devices. For example, information stored on the memory of a garage door opener may be accessed from the wall unit 200 or a computing device.

Figure 5:
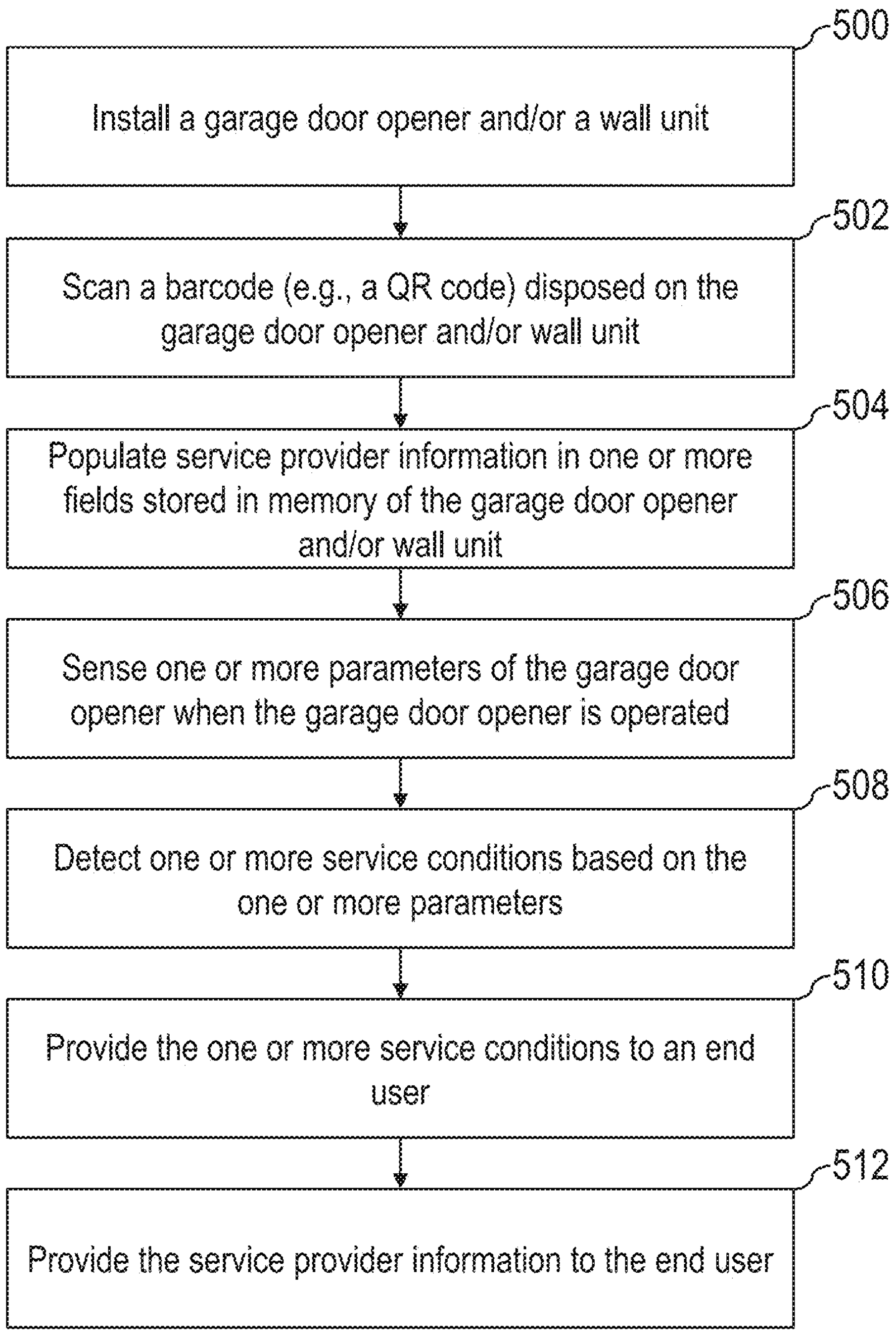
FIG. 5 is a flow chart of one embodiment of a method of installing and operating a garage door opener system.

FIG. 5 is a flow chart of one embodiment of a method of installing and operating a garage door opener system. In step 500, a garage door opener and/or a wall unit is installed (e.g., by a service provider). In step 502, a barcode (e.g., a QR code) disposed on the garage door opener and/or wall unit is scanned. The code may be scanned with a service provider device such as a smartphone or PDA. In step 504, service provider information is populated in one or more fields stored in memory of the garage door opener and/or wall unit.

For example, scanning the code may allow the servicer device or a remote servicer to transmit the service provider information to the garage door opener and/or wall unit. In one example, a servicer device may directly transmit the service provider information to the garage door opener and/or wall unit.

Once installed and the one or more fields are populated, one or more parameters of the garage door opener may be sensed when the garage door opener is operated in step 506. For example, a current sensor may monitor motor current draw, a position sensor may monitor the position of the garage door or an associate component, and/or a camera may capture images of the garage door for processing. The one or more parameters (i.e., information), may be analyzed by a processor disposed locally in the garage door opener, wall unit and/or power unit or remotely (e.g., at a remote server). Accordingly, in step 508, one or more service conditions (e.g., anomalies) may be detected based on the information from the sensors. The service conditions may indicate performance of the garage door opener, including nominal operation, degradation to be addressed with regular maintenance, significant degradation to be addressed with repairs, or another condition. In step 510, the one or more service conditions may be provided to an end user. For example, a display of the wall unit or an associated computing device may relay the service condition to the user. In step 512, the service provider information is provided to the end user. The service provider information may be provided through the same indication or display that provided the service condition to the user. In some embodiments, the method may also include allowing a user to schedule an appointment with the service provider, browse a list of service providers, or contact the service provider.

Figure 6:
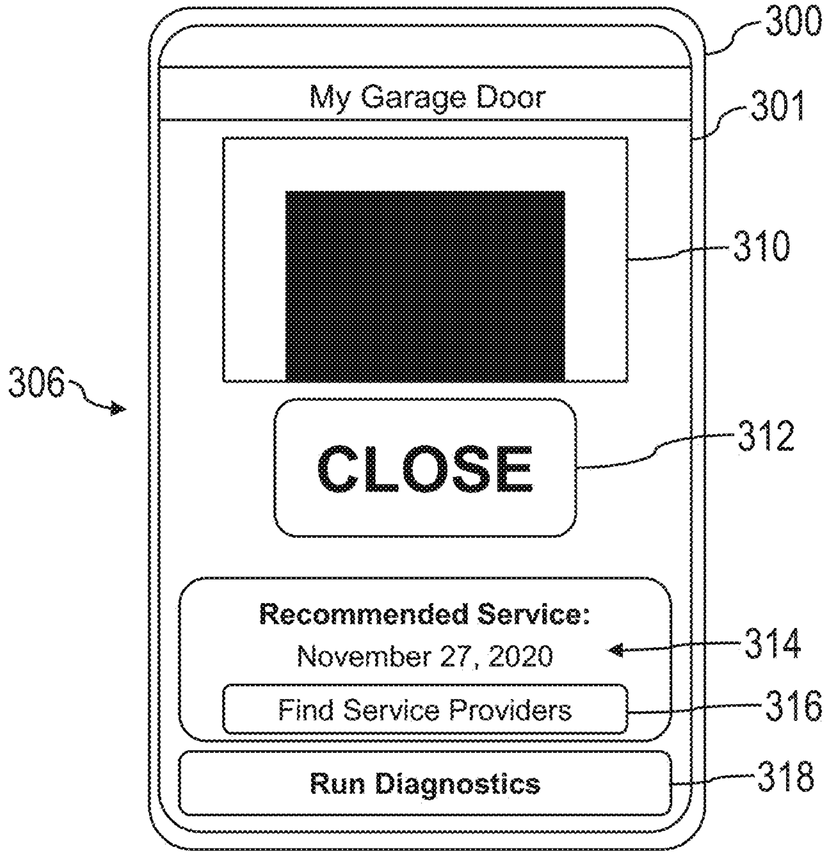
FIG. 6 is a schematic of one embodiment of a mobile device displaying a first user interface.
Figure 7:
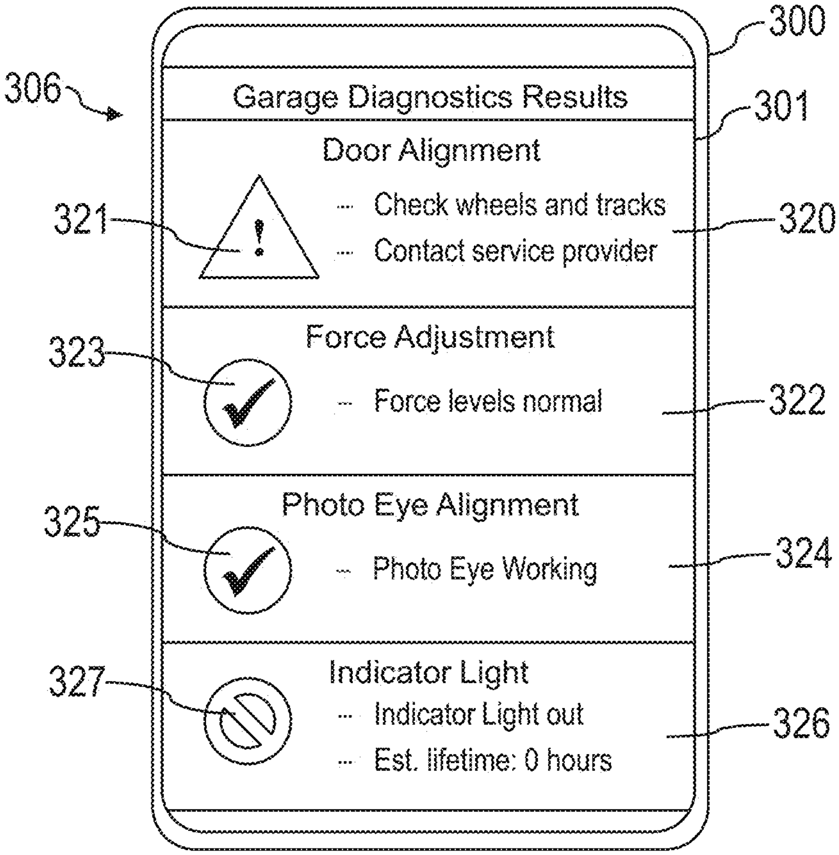
FIG. 7 is a schematic of the mobile device of FIG. 6 displaying a second user interface.
Figure 8:
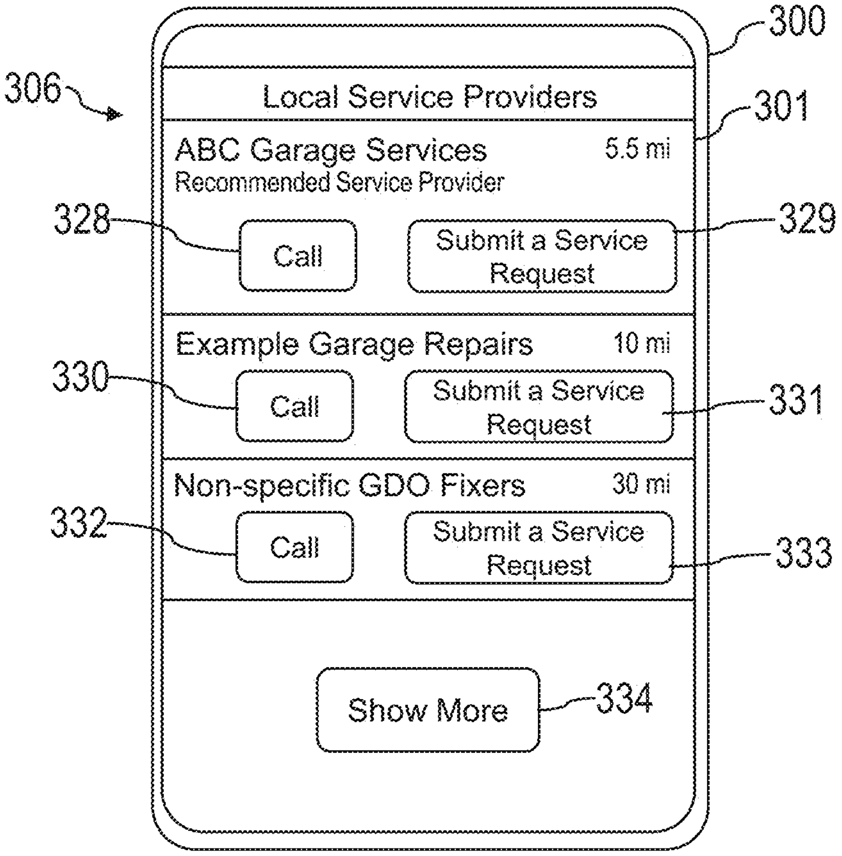
FIG. 8 is a schematic of the mobile device of FIG. 6 displaying a third user interface.

FIGS. 6-8 depict various user interfaces for controlling a garage door opener system and performing related functions, including diagnostics and service management. While the embodiments of FIGS. 6-8 depict the user interface on a mobile device like a smartphone, any suitable device having a user interface may be employed to perform the functions described. For example, a wall unit may have a display functionally replicating the user interface described with reference to FIGS. 6-8. Of course, other personal computing devices may be employed such as personal computers, tablets, etc., as the present disclosure is not so limited.

FIG. 6 is a schematic of one embodiment of a computing device 300 configured as a mobile device displaying a user interface 306 for control of a garage door opener system. As shown in FIG. 6, the mobile device is configured as a smartphone capable of running applications. The user interface 306 is provided on a display screen 301 which may also function as an input device capable of receiving and interpreting touch inputs. As shown in FIG. 6, the user interface may provide a visualization 310 of an associated garage door status. In the state shown in FIG. 6, the user interface is indicating the garage door is in an open configuration. Accordingly, a control button 312 is provided which allows the user to close the garage door. In another state when the garage door is closed, the visualization 310 may show a closed garage door and the control button 312 may read "OPEN" instead of "CLOSE", making it clear what the current status of the garage door is and the action that may be taken by the user to change the status.

According to the embodiment of FIG. 6, the user interface 306 provides additional information of the garage door beyond open or closed status. That is, a recommended service date 314 is provided to the user. The garage door opener system may track a number of cycles, average daily cycles, and other performance metrics to project a date on which garage door servicing should occur. Alternatively, in some embodiments, the user interface 306 may display a total cycle count to allow a user to track the number of cycles before maintenance. In some embodiments, the user interface may provide a countdown of remaining cycles until recommended service.

In some embodiments as shown in FIG. 6, the user interface 306 may also include functionality to allow a user to find service providers. The user interface may include a service provider button 316 that may change the user interface to a display like that described further with reference to FIG. 8, where a user may access one or more service providers. In some embodiments, the user interface or computing device 300 may provide a notification that a recommended service date or cycle count is approaching or due. Accordingly, a user may use the service provider button 316 to find service providers to contact them directly or to schedule a service.

According to the embodiment of FIG. 6, the user interface also includes a run diagnostics button 318. In some embodiments, the run diagnostics button may cause a garage door opener system to enter a diagnostics mode, where one or more sensors collect information about the garage door opener system as a garage door cycles between open and closed positions. In other embodiments, the run diagnostics button may allow a user to access previously recorded data and analysis from one or more sensors that monitor the operation of the garage door opener system. One embodiment of a diagnostics report accessed via the run diagnostics button 318 is shown and discussed further with reference to FIG. 7.

FIG. 7 is a schematic of the computing device 300 of displaying diagnostics results for a garage door opener system. As shown in FIG. 7, the diagnostics report provides information regarding various different parameters of a garage door opener, as reported on by one or more sensors. At the top of the user interface 306, a door alignment indicator 320 and associated icon 321 relays information about the door alignment to a user. In the state depicted in FIG. 7, the indicator provides instructions to a user to check the wheels and tracks and/or to contact a service provider. As the alignment does not prevent operation of the garage door, the icon 321 may give a quick indication that there is performance degradation. The user interface also provides a force adjustment indicator 322 and associated icon 323. In the state shown in FIG. 7, the force adjustment as measured by sensors of the garage door opener system is nominal, and accordingly the force adjustment indicator 322 and icon 323 relay that status. If the force adjustment is anomalous, that status and any self-help instructions may be provided to a user. The user interface 306 also provides a photo-eye indicator 324 and associated icon 325. In the state shown, the photo-eye is working normally and that status is reported via the photo-eye indicator 324 and icon 325. However, if the photo-eye were non-functional, that status may be reported and instructions for adjusting the photo-eye provided via the user interface 306. Finally, the user interface also provides an indicator light indicator 326 and associated icon 327. According to the state shown in FIG. 7, the indicator light is not working and the indicator and icon relays this information. If the indicator light is working, the indicator light indicator 326 may provide an estimated lifetime of the indicator light, such that a user may plan to replace the indicator light at regular intervals. In some embodiments, a user may press an icon to retrieve a more detailed report from the sensors and/or retrieve service provider information.

While an example of a diagnostics report and various indicators are shown in FIG. 7, any suitable number of statuses may be provided to an end user. In some embodiments, a similar diagnostics report may be provided to an authorized service provider. Such an arrangement may simplify repairs and maintenance performed by a service provider.

FIG. 8 is a schematic of the computing device 300 displaying service provider information. As shown in FIG. 8, in one embodiment the user interface 306 provides a plurality of services providers to choose from. A recommended service provider is provided near the top of the user interface. The recommended service provider may be provided based on the service provider who installed the garage door opener system or performed the latest service and scanned a code with a service provider device. Alternative service providers are also provided to a user. According to one embodiment as shown in FIG. 8, the distance of each service provider relative to the garage door opener system is provided. Additionally, a call button 328, 330, 332 is provided for each service provider. In the case the computing device 300 is a smartphone, the call buttons may be used to immediately initiate a call to a service provider without dialing. A service request button 329, 331, 333 is also provided for each service provider. Pressing a service request button may also allow a user to schedule a service appointment online. The service request button may also transmit diagnostic information, including sensor information or one or more profiles of a garage door opener, to the chosen service provider on command. Finally, the user interface also provides a "Show More" button 334 that allows a user to retrieve additional service providers if desired.

Figure 9:
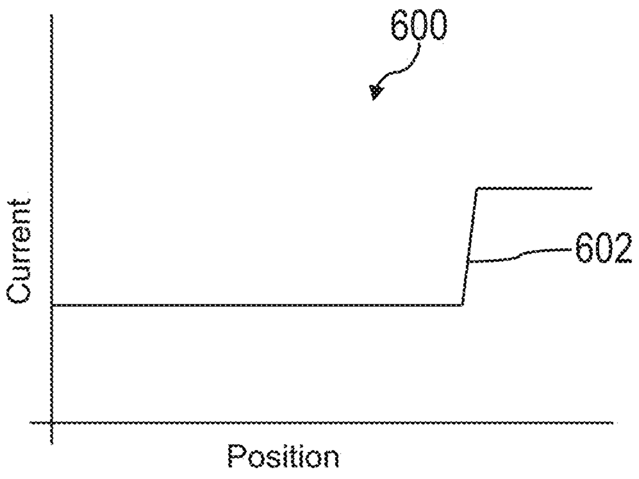
FIG. 9 is a graph of one example of current data recorded for a garage door opener as a garage door is moved from a first position to a second position.
Figure 10:
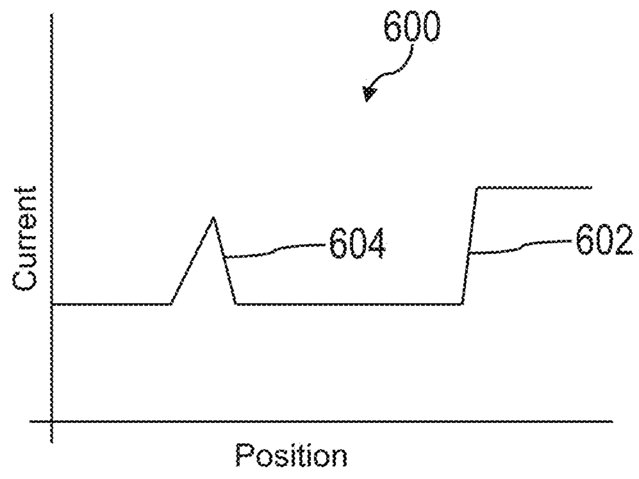
FIG. 10 is a graph of another example of current data recorded for a garage door opener as a garage door is moved from a first position to a second position.
Figure 11:
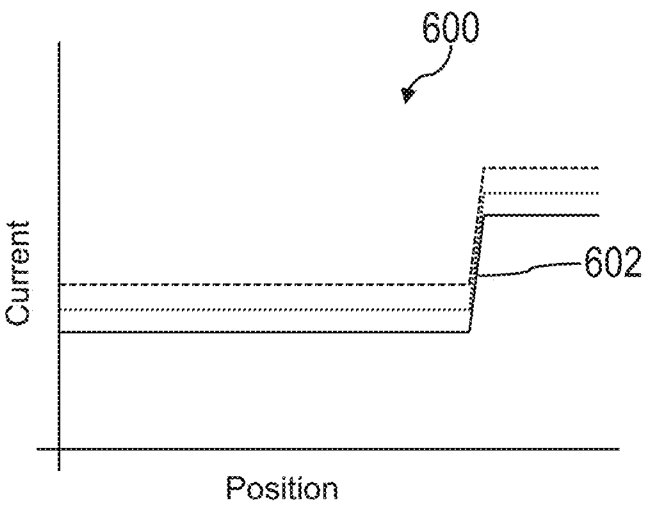
FIG. 11 is a graph of another example of current data recorded for a garage door opener as a garage door is moved from a first position to a second position.

FIGS. 9-11 depict graphs showing some embodiments of methods for identifying one or more anomalies in a measured profile of a garage door opener as sensed by a current sensor. However, any suitable number of profiles may be generated based on the input of one or more sensors, and the identification of anomalies in a garage door opener system is not limited in this regard. Additionally, any suitable technique may be employed to compare and differentiate profiles or data sets recorded during garage door operating, including thresholding, peak detection, and others.

FIG. 9 is a graph of one example of current data 600 recorded for a garage door opener as a garage door is moved from a first position to a second position. That is, as the garage door is moved from the first position (e.g., open position) to the second position (e.g., closed position), motor current draw is recorded and shown in the chart of FIG. 9. According to the embodiment of FIG. 9, an increase 602 in motor current is associated with a garage door reaching the end of travel and being prevented from moving further. The chart shown in FIG. 9 may be representative of a nominal profile for a garage door opener. In some embodiments, a chart like that in FIG. 9 is a baseline profile which may be formed by averaging a plurality of movements of the garage door between the first position and second position.

FIG. 10 is a graph of another example of current data 600 recorded for a garage door opener as a garage door is moved from a first position to a second position. According to the embodiment shown in FIG. 10, the current data 600 is recorded for the same movement that was recorded in FIG. 9. However, in addition to the increase 602 in motor current at the end of travel, an anomalous increase 604 is shown in the graph of FIG. 10. This increase in motor current may be associated with increased friction at a certain position of the garage door, which may be indicative of an alignment problem, a faulty rail, and/or a faulty wheel, for example. Accordingly, the anomaly may be reported to an end user (e.g., via an alert or notification) and/or sent to a service provider so that appropriate action may be taken.

FIG. 11 is a graph of another example of current data 600 recorded for a garage door opener as a garage door is moved from a first position to a second position over multiple cycles. According to the embodiment of FIG. 11, the solid line may be a baseline profile, and each subsequent profile generated may have a higher average motor current. This higher average motor current may be associated with normal wear and tear (e.g., reduction of lubrication, wearing out wheels or bearings, etc.). Accordingly, tracking the average motor current of each profile generated by a garage door opener and comparing that with the baseline profile may allow maintenance intervals to be tracked more accurately. That is, a standard maintenance interval may be adjusted based on the feedback provided by the current data 600. Once the average current exceeds a threshold, a service may be recommended to a user (e.g., with a display or indicator light).

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a processor executable storage medium (or multiple processor executable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a processor executable storage medium may retain information for a sufficient time to provide computer-executable instructions in a non-transitory form. Such a processor executable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a processor executable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A garage door opener system comprising:

a motor configured to move a garage door between a first position and a second position;

at least one sensor configured to collect information about the garage door as the garage door moves between the first position and the second position;

memory including processor executable instructions; and a processor configured to execute the processor executable instructions stored in the memory, wherein the processor is configured to receive a user input to initiate a diagnostics mode from a remote device of a user, wherein in the diagnostics mode the processor is configured to:

receive the information from the at least one sensor;

determine one or more profiles of the garage door from the information collected on one or more movements of the garage door between the first position and the second position, wherein the one or more profiles each comprises a series of sensed conditions of the garage door opener system over time as the garage door moves between the first position and the second position, compare the one or more profiles to a baseline profile comprising a series of baseline conditions of the garage door opener system over time corresponding to a baseline movement of the garage door between the first position and the second position, identify one or more anomalies in the one or more profiles based on comparing the one or more profiles to the baseline profile, and alert a user to the one or more anomalies.

2. The garage door opener system of claim 1, further comprising a wireless transceiver configured to communicate with the remote device.

3. The garage door opener system of claim 2, wherein in the diagnostics mode the processor is further configured to transmit the one or more anomalies to a service provider via the wireless transceiver.

4. The garage door opener system of claim 2, wherein in the diagnostics mode the processor is further configured to transmit the one or more anomalies to the remote device of the user via the wireless transceiver.

5. The garage door opener system of claim 4, wherein in the diagnostics mode the processor is further configured to provide one or more repair steps to the user based on the one or more anomalies identified.

6. The garage door opener system of claim 4, wherein in the diagnostics mode the processor is further configured to provide contact information for one or more service providers.

7. The garage door opener system of claim 1, further comprising an indicator light, wherein alerting a user to the one or more anomalies includes illuminating the indicator light.

8. The garage door opener system of claim 1, further comprising a speaker, wherein alerting a user to the one or more anomalies includes generating an audible signal on the speaker.

9. The garage door opener system of claim 8, wherein the audible signal is a voice signal.

10. The garage door opener system of claim 1, wherein the at least one sensor includes a current sensor configured to detect a current draw of the motor, wherein the series of sensed conditions of the garage door opener system over time comprises a series of motor current draw measurements, and wherein the processor is configured to compare the series of motor current draw measurements to a series of baseline motor current draws of the garage door opener system over time corresponding to a baseline movement of the garage door between the first position and the second position.

11. The garage door opener system of claim 1, wherein the at least one sensor includes a position sensor configured to detect a position of the garage door, and wherein the series of sensed conditions of the garage door opener system over time comprises a series of detected garage door positions, and wherein the processor is configured to compare the series of detected door positions to a series of baseline door positions of the garage door opener system over time corresponding to a baseline movement of the garage door between the first position and the second position.

12. The garage door opener system of claim 1, wherein the at least one sensor includes a camera.

13. The garage door opener system of claim 1, wherein the processor is disposed in a remote server.

14. The garage door opener system of claim 1, wherein the user input is received through an interface, wherein the interface is at least one of a physical interface and a graphical user interface.

15. A garage door opener system comprising:

a garage door opener including:

one or more sensors configured to collect information about a garage door as the garage door moves between a first position and a second position, and a wireless transceiver; and a remote device in communication with the wireless transceiver including:

a screen displaying a graphical user interface, memory including processor executable instructions, and a processor configured to execute the processor executable instructions stored in the memory on command from the graphical user interface, wherein the graphical user interface is operable to instruct the garage door opener to move the garage door between the first position and the second position, and wherein the graphical user interface is operable to initiate a diagnostics mode in which the processor:

receives information from the one or more sensors, determines one or more profiles of the garage door from information collected on one or more corresponding movements of the garage door between the first position and second position, wherein the one or more profiles each comprises a series of sensed conditions of the garage door opener system over time as the garage door moves between the first position and the second position, compares the one or more profiles to a baseline profile comprising a series of baseline conditions of the garage door opener system over time corresponding to a baseline movement of the garage door between the first position and the second position, identifies one or more anomalies in the one or more profiles based on a comparison of the one or more profiles to the baseline profile, and alerts a user to the one or more anomalies.

16. The garage door opener system of claim 15, wherein the graphical user interface is operable to initiate a service mode in which the processor transmits the one or more anomalies to a remote device of the user via the wireless transceiver.

17. The garage door opener system of claim 15, wherein in the diagnostics mode the processor further provides one or more repair steps to the user based on the one or more anomalies identified.

18. The garage door opener system of claim 15, wherein in the diagnostics mode the processor further provides contact information for one or more service providers.

19. The garage door opener system of claim 15, further comprising an indicator light, wherein alerting a user to the one or more anomalies includes illuminating the indicator light.

20. The garage door opener system of claim 15, further comprising a speaker, wherein alerting a user to the one or more anomalies includes generating an audible signal on the speaker.

21. The garage door opener system of claim 20, wherein the audible signal is a voice signal.

22. The garage door opener system of claim 15, wherein the one or more sensors includes a current sensor configured to detect a current draw of a motor configured to move the garage door between the first position and second position.

23. The garage door opener system of claim 15, wherein the one or more sensors includes a position sensor configured to detect a position of the garage door.

24. The garage door opener system of claim 15, wherein the one or more sensors includes a camera.

* * * * *